US011201971B1

(12) United States Patent
Tanaka et al.

(10) Patent No.: US 11,201,971 B1
(45) Date of Patent: Dec. 14, 2021

(54) MAINTENANCE SUPPORT APPARATUS AND MAINTENANCE SUPPORT METHOD (71) Applicant: TOSHIBA TEC KABUSHIKI KAISHA, Tokyo (JP)

(72) Inventors: Hiroyo Tanaka, Tokyo (JP); Kazuhiro Ogura, Kanagawa (JP); Masaki Narahashi, Tokyo (JP); Tatsuya Inagi, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/031,284

(22) Filed: Sep. 24, 2020

(51) Int. Cl.
H04N 1/00 (2006.01)

(52) U.S. Cl.
CPC ..... *H04N 1/00074* (2013.01); *H04N 1/00029* (2013.01); *H04N 1/0097* (2013.01); *H04N 1/00344* (2013.01); *H04N 2201/0094* (2013.01)

(58) Field of Classification Search
CPC ...... G06F 3/121; G06F 3/1285; G06F 3/1208; G06F 3/1222; G06F 3/1238; G06F 3/1243; G06F 3/1261; G06F 3/1273; H04N 2201/0094; H04N 1/00204; H04N 1/00307; H04N 1/00323; H04N 1/00344; H04N 1/00347; H04N 1/00392; H04N 1/00477; H04N 1/00973; H04N 1/32609; H04N 1/32678; H04N 1/4446; H04N 2201/001; H04N 2201/0015; H04N 2201/0072; H04N 1/00074; H04N 1/00029; H04N 1/0097; G03G 15/5087; G03G 2215/00109

USPC .......................................................... 358/1.1
See application file for complete search history.

(56) References Cited

U.S. PATENT DOCUMENTS

| 8,643,865 | B2* | 2/2014 | Katou | ....................... G06F 3/12 |
| | | | | 358/1.14 |
| 2007/0067681 | A1* | 3/2007 | Hikawa | .............. H04N 1/00344 |
| | | | | 714/47.1 |
| 2011/0216358 | A1* | 9/2011 | Katou | ....................... G06F 3/12 |
| | | | | 358/1.15 |

(Continued)

FOREIGN PATENT DOCUMENTS

| JP | 11-327381 A | 11/1999 |
| JP | 2007-199642 A | 8/2007 |
| JP | 2013-225073 A | 10/2013 |

*Primary Examiner* — Negussie Worku
(74) *Attorney, Agent, or Firm* — Foley & Lardner LLP (57) ABSTRACT A maintenance support apparatus includes one or more processors and a memory having instructions stored thereon that, when executed by the one or more processors, cause the one or more processors to perform operations including: storing both (a) acceptable maintenance levels associated with a user that are related to an apparatus and (b) estimated failure levels corresponding to a plurality of diagnosis algorithms correlated with a plurality of maintenance works; acquiring operation log data of the apparatus and diagnose the operation log data according to each of the plurality of diagnosis algorithms; determining whether maintenance of the apparatus is necessary, based on a comparison between (a) the estimated failure levels corresponding to the one or more maintenance tasks identified when diagnosing the operation log data and (b) the acceptable maintenance levels of the user; and providing a notification indicating whether maintenance of the apparatus is necessary.

20 Claims, 5 Drawing Sheets (56) References Cited

U.S. PATENT DOCUMENTS

| | | | | |
|---|---|---|---|---|
| 2011/0299109 | A1* | 12/2011 | Kamisuwa | H04N 1/00973 |
| | | | | 358/1.14 |
| 2016/0224947 | A1* | 8/2016 | Ishimaru | G06F 21/608 |
| 2016/0241728 | A1* | 8/2016 | Naruse | G06F 3/121 |
| 2016/0378584 | A1* | 12/2016 | Oku | G06F 11/079 |
| | | | | 358/1.14 |
| 2018/0059996 | A1* | 3/2018 | Ishizu | G06F 3/1234 |
| 2018/0212540 | A1* | 7/2018 | Shim | H02P 29/0241 |
| 2019/0281172 | A1* | 9/2019 | Baba | H04N 1/00039 |
| 2020/0117401 | A1* | 4/2020 | Shibata | H04N 1/00042 |
| 2020/0282659 | A1* | 9/2020 | Lan | B29C 64/241 |
| 2020/0314251 | A1* | 10/2020 | Kobayashi | H04N 1/00076 |

* cited by examiner

FIG. 2

| MAINTENANCE WORK | DIAGNOSIS ALGORITHM | IMAGE QUALITY | NOISE | ERROR OCCURRENCE STATUS | MAINTENANCE COST |
|---|---|---|---|---|---|
| A | Diagnosis_a | NOT AFFECTED | NOT AFFECTED | FREQUENT JAM OCCURRENCE | 700 |
| B | Diagnosis_b | NOT AFFECTED | NOT AFFECTED | SERVICE CALL OCCURRED | 10,000 |
| C | Diagnosis_c | NOT AFFECTED | 60~80dB | NOT AFFECTED | 7,000 |
| D | Diagnosis_d | SMALL IMAGE QUALITY DETERIORATION | 60~80dB | NOT AFFECTED | 500 |

FIG. 3

| USER ID | USER NAME | IMAGE QUALITY | NOISE | ERROR OCCURRENCE STATUS | ACCEPTABLE MAINTENANCE COST |
|---|---|---|---|---|---|
| XXXXX | user_X | NORMAL IMAGE QUALITY | ACCEPTED | NO STOPPING | 5,000 |
| YYYYY | user_Y | HIGH QUALITY | ~80dB | ACCEPT JAM | 7,000 |
| ZZZZZ | user_Z | ACCEPTED | ~80dB | ONLY CALL RESPONSE | 1,000 |
| WWWWW | user_W | NORMAL IMAGE QUALITY | ~60dB | NO STOPPING | 10,000 |

MAINTENANCE SUPPORT APPARATUS AND MAINTENANCE SUPPORT METHOD

FIELD

Embodiments described herein generally relate to a maintenance support apparatus and a maintenance support method.

BACKGROUND

Recently, it is required for the office equipment such as image forming apparatuses to detect and solve a fault promptly in order to realize high productivity. In order to avoid the fault in advance, it is required to carry out the maintenance optimized for each user and equipment. Therefore, many methods for diagnosing a fault of the image forming apparatus have been proposed.

However, it is difficult to carry out optimized maintenance for all users with uniform diagnostic criteria. When a plurality of fault diagnosis methods are used and maintenance work is performed based on all the fault diagnosis results, it may result in providing excess service to the user. Another method is proposed, which corrects reference values for determining component replacement based on a complaint from a user at the time of component replacement, but the method does not consider the users without complaints. Therefore, it is difficult to realize maintenance according to the maintenance level of the user.

DETAILED DESCRIPTION

In one embodiment, a maintenance support apparatus includes a storage unit, an acquisition unit, a diagnosis unit, a determination unit, and an output unit. The storage unit stores acceptable maintenance levels of a user that are related to the apparatus, and estimated failure levels corresponding to diagnosis algorithms correlated with a plurality of maintenance works. The acquisition unit acquires operation log data of the apparatus. The diagnosis unit diagnoses the operation log data acquired by the acquisition unit using each of a plurality of diagnosis algorithms. The determination unit determines whether maintenance of the apparatus is necessary, based on a comparison between the estimated failure levels, which correspond to one or more maintenance works for which an alert is issued based on a result of diagnosis of the diagnosis unit, and the acceptable maintenance levels of the user. The output unit outputs a determination result of the determination unit.

Figure 1:
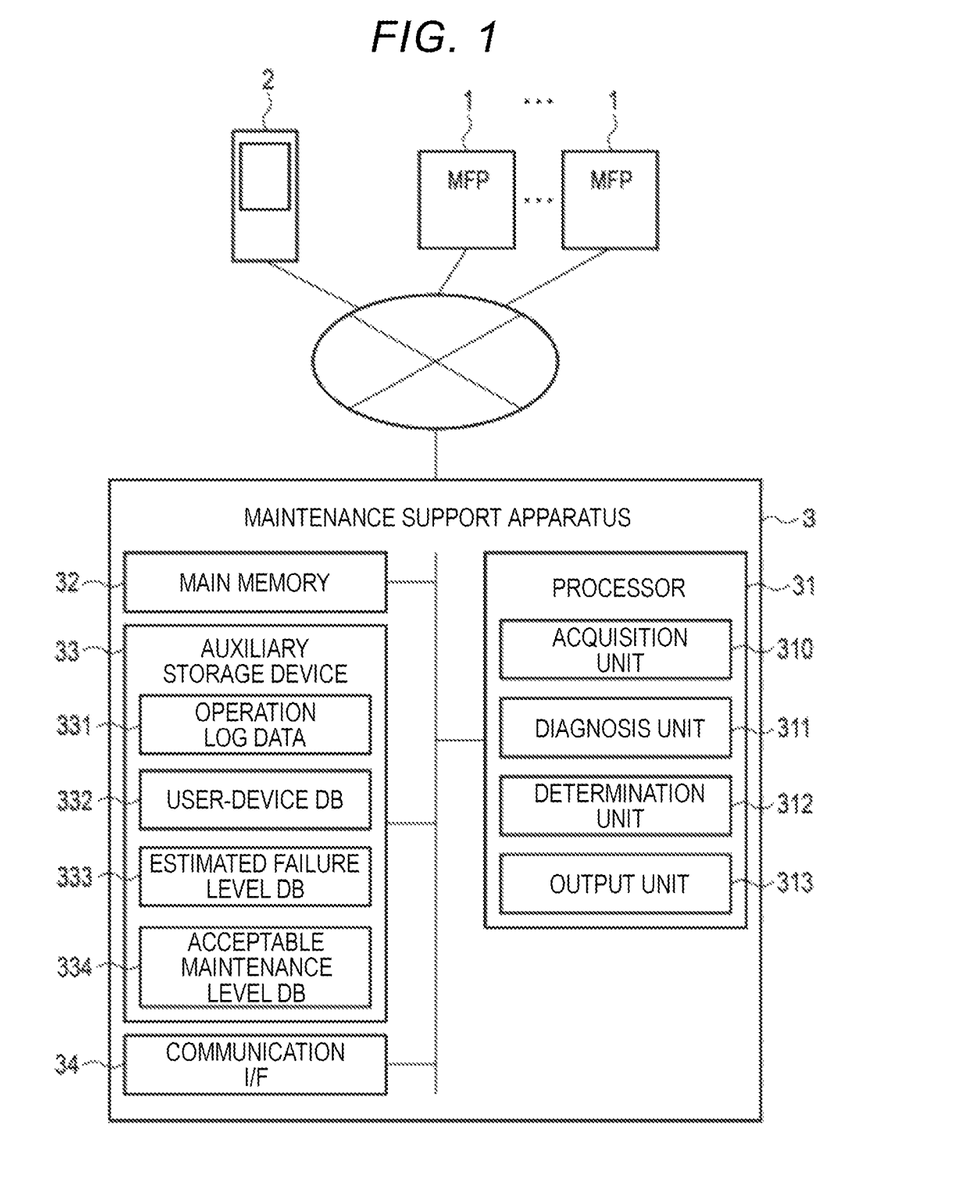
FIG. 1 is a block diagram illustrating a maintenance support system according to an embodiment.

Hereinafter, embodiments will be described with reference to the drawings. FIG. 1 is a block diagram illustrating a maintenance support system 100, according to an exemplary embodiment. The maintenance support system 100 includes an image forming apparatus 1, a terminal 2, and a maintenance support apparatus 3. The image forming apparatus 1, the terminal 2, and the maintenance support apparatus 3 are connected to each other via a network by wires or wirelessly to communicate with each other. The network is the Internet, for example. The maintenance support system 100 may also refer to a system including at least two of the image forming apparatus 1, the terminal 2, or the maintenance support apparatus 3. The image forming apparatus 1 may also be simply referred to as the "apparatus".

The image forming apparatus 1 is an apparatus that executes printing, scanning, copying, faxing, image transmission and reception, and the like. For example, the image forming apparatus 1 is a multi function peripheral (MFP). The image forming apparatus 1 includes an image reading unit and an image forming unit.

The image reading unit is a scanner that reads a document and captures image data from the document. For example, the image reading unit includes an image sensor, and the like. The image sensor is an image sensor having an arrangement of lines of pixels that are converted from light into electric signals (e.g., image signals). The image sensor includes a charge coupled device (CCD), a complementary metal oxide semiconductor (CMOS), or other image sensors.

The image forming unit is a printer that forms an image on a print medium. For example, the image forming unit includes a photosensitive drum, an electrostatic charger, an exposure device, a developing device, and the like. The surface of the photosensitive drum is uniformly charged by the electrostatic charger. The exposure device emits light having a wavelength that can form a latent image on the charged photosensitive drum according to an electric signal of document data or image data, and forms an electrostatic latent image on the charged photosensitive drum. The developing device attaches toner (e.g., developer) onto the electrostatic latent image formed on the photosensitive drum to form a toner image (e.g., a toner image) on the surface of the photosensitive drum. The image forming unit transfers the toner image formed on the surface of the photosensitive drum onto a print medium and fixes the toner image on the print medium to form an image on the print medium.

The image forming apparatus 1 (e.g., a printer, a scanner, etc.) transmits information such as error data, a counter, and the like to the maintenance support apparatus 3. The error data include information indicating an error history, for example. The counter includes a number of sheets used, a number of rotations of the roller, an operating time of the heater, and the like, for example.

The terminal 2 (e.g., an interface) is a device capable of communicating with other devices. The terminal 2 is a device used by a worker who performs maintenance work. For example, the terminal 2 is a tablet terminal or the like. The terminal 2 includes an input unit and a display unit. The input unit (e.g., an input device, a user interface, etc.) is an input device that receives an input from a user. For example, the input unit is a touch pad layered on the display unit. The display unit (e.g., a display, a user interface, etc.) is an element that displays various types of information. For example, the display unit is a liquid crystal display. The terminal 2 is a device for displaying a maintenance work list of the image forming apparatus 1 and inputting a maintenance work result. The maintenance work list is a list indicating a maintenance work (e.g., maintenance process, a maintenance task, a maintenance activity, etc.) recommended for the image forming apparatus 1. The maintenance work includes tasks such as repair and maintenance of each part of the image forming apparatus 1. Details of the maintenance work list will be described below. The worker performs the maintenance work according to the maintenance work list, and inputs the maintenance work result to the terminal 2 after the maintenance work is completed. The terminal 2 transmits the maintenance work result of the image forming apparatus 1 to the maintenance support apparatus 3.

The maintenance support apparatus 3 is an apparatus that collects data and processes the collected data. The maintenance support apparatus 3 cleanses the collected data and stores the cleansed data. For example, the maintenance support apparatus 3 may be a server. The maintenance support apparatus 3 acquires operation log data from a plurality of image forming apparatuses 1 and stores the acquired operation log data. The operation log data includes data related to the operation or the like of the image forming apparatus 1, such as error data, counter, or the like. The operation log data is configured to include identification information. The identification information is information for identifying the respective image forming apparatuses 1. For example, the identification information is a serial number. The maintenance support apparatus 3 acquires the maintenance work result of the image forming apparatus 1 from the terminal 2 and stores the acquired maintenance work result.

An example of the configuration of the maintenance support apparatus 3 will be described. The maintenance support apparatus 3 is a computer (e.g., a controller) including a processor 31, a main memory 32, an auxiliary storage device 33, and a communication interface 34. The respective parts forming the maintenance support apparatus 3 are connected to each other so that signals may be input and output. In FIG. 1, the interface is described as "I/F".

The processor 31 corresponds to a central part of the maintenance support apparatus 3. For example, the processor 31 is a central processing unit (CPU), but is not limited thereto. The processor 31 may include one or more individual processors. The processor 31 may include various circuits. The processor 31 loads a program stored in advance in the main memory 32 or the auxiliary storage device 33 into the main memory 32. The program is a program for causing the processor 31 of the maintenance support apparatus 3 to realize or execute each unit described below. The processor 31 executes various operations by executing the program loaded in the main memory 32 (i.e., the main memory 32 may have instructions stored thereon that, when executed by the processor 31, cause the processor 31 to perform various operations).

The main memory 32 corresponds to the main storage unit of the maintenance support apparatus 3. The main memory 32 includes a non-volatile memory area and a volatile memory area. The main memory 32 stores an operating system or a program in a non-volatile memory area. The main memory 32 uses the volatile memory area as a work area in which data is appropriately rewritten by the processor 31. For example, the main memory 32 includes a read only memory (ROM) as the non-volatile memory area. For example, the main memory 32 includes a random access memory (RAM) as the volatile memory area. The main memory 32 stores the program.

The auxiliary storage device 33 corresponds to an auxiliary storage unit of the maintenance support apparatus 3. The auxiliary storage device 33 is an electric erasable programmable read-only memory (EEPROM) (registered trademark), a hard disc drive (HDD), a solid state drive (SSD), or the like. The auxiliary storage device 33 stores the program described above, data used by the processor 31 for performing various processes, and data generated by the process of the processor 31. The auxiliary storage device 33 is an example of a storage unit.

The auxiliary storage device 33 stores operation log data 331, a user-device database 332, an estimated failure level database 333, and an acceptable maintenance level database 334. The operation log data 331 includes a record configured with the data correlating the serial number of the image forming apparatus 1, the error data, the counter, the maintenance work result, and the like.

The user-device database 332 includes a record configured with the data correlating a user name of a user related to the image forming apparatus 1, a user ID, a serial number of the image forming apparatus 1, a model number, and the like. The operation log data 331 is correlated with the user-device database 332 using the serial number as a key.

The estimated failure level database 333 stores estimated failure levels corresponding to diagnosis algorithms correlated with a plurality of maintenance works. The estimated failure level indicates an estimation as to status and degree of a failure when an alert is issued by the diagnosis algorithm. The estimated failure level database 333 includes an estimated failure level record configured with the data correlating an estimated failure level regarding a failure item such as a maintenance work, a diagnosis algorithm, an image quality of the image forming apparatus 1, noise, an error occurrence status, and the like, and a maintenance cost, and the like. The estimated failure level record may include an estimated failure level related to one failure item, or may include estimated failure levels related to a plurality of failure items. The diagnosis algorithm is an algorithm for determining presence of a failure that is estimated to occur in the future in a component or the like as the target of the maintenance work, based on the diagnosis of the operation log data. For example, a failure is a fault or the like that is estimated to occur within a certain period of time such as 1 to 2 weeks. The certain period of time is not limited to this example and may be set appropriately. The maintenance cost is a cost required for the maintenance work in order to avoid or eliminate the estimated failure. An exemplary configuration of the estimated failure level database 333 will be described below.

The acceptable maintenance level database 334 includes an acceptable maintenance level record configured with the data correlating respective acceptable maintenance levels of the user that are related to the image forming apparatus 1 with the user ID. The acceptable maintenance level is information indicating a degree of acceptability of the operation of the image forming apparatus 1 with respect to the failure item such as image quality, noise (e.g., a noise level), error occurrence status, or the like. For each failure item, a maintenance work with the estimated failure level exceeding the acceptable maintenance level is determined to be a required maintenance work. The required maintenance work is a maintenance work that needs to be performed. The acceptable maintenance level record may include an acceptable maintenance level related to one failure item, or may include the acceptable maintenance levels related to a plurality of failure items. The acceptable maintenance level record may include an acceptable maintenance cost. The acceptable maintenance cost indicates an acceptable cost for an additional maintenance work to be performed when a maintenance worker performs the required maintenance work. The additional maintenance work is selected from the maintenance works among the maintenance works for which an alert is issued, except the required maintenance work. An exemplary configuration of the acceptable maintenance level database 334 will be described below.

The communication interface 34 includes various interfaces for communicatively connecting the maintenance support apparatus 3 to other apparatuses via a network according to a certain communication protocol.

The configuration of the hardware of the maintenance support apparatus 3 is not limited to the configuration described above. In the maintenance support apparatus 3, the components described above may be appropriately omitted or changed and new components may be added as appropriate.

Each unit installed in the processor 31 described above will be described below. The processor 31 includes an acquisition unit 310, a diagnosis unit 311, a determination unit 312, and an output unit 313 installed therein. Each unit installed in the processor 31 can also be said as each function. It may also be said that each unit installed in the processor 31 is installed on a control unit including the processor 31 and the main memory 32.

The acquisition unit 310 acquires data from the image forming apparatus 1. For example, the acquisition unit 310 acquires the operation log data of the image forming apparatus 1.

The diagnosis unit 311 acquires the operation log data stored in the auxiliary storage device 33. The diagnosis unit 311 diagnoses the operation log data by a diagnosis algorithm corresponding to each maintenance work. "Diagnosing" includes one or more processes such as analysis and calculation. The diagnosis unit 311 issues an alert for the maintenance work corresponding to the diagnosis algorithm that determines that a future failure is to occur within a certain period of time. The diagnosis unit 311 estimates a failure occurrence date for the maintenance work for which an alert is issued. The failure occurrence date indicates when the failure is estimated to occur. The failure occurrence date is a day within a certain period of time, such as "5 days later" or "1 week later". The diagnosis unit 311 creates an alert item list. The alert item list is data including a record related to the maintenance work for which an alert is issued, among the estimated failure level records. The alert item list includes a record configured with the data correlating the failure occurrence date in an estimated failure level record. The diagnosis unit 311 saves the alert item list in the auxiliary storage device 33. The alert item list is updated each time a diagnosis is performed by the diagnosis algorithm.

The determination unit 312 compares the acceptable maintenance level with the estimated failure level for the maintenance work for which an alert is issued. The determination unit 312 determines whether the maintenance of the image forming apparatus 1 is necessary based on the comparison result. The determination unit 312 determines a recommended maintenance work from the alert item list. The recommended maintenance work is a maintenance work recommended to be performed for the image forming apparatus 1. The recommended maintenance work includes the required maintenance work determined by comparing the acceptable maintenance level with the estimated failure level, and the additional maintenance work to be performed additionally. The additional maintenance work is determined by comparing the maintenance cost of the estimated failure level record with the acceptable maintenance cost of the acceptable maintenance level record. The determination unit 312 determines a recommended maintenance date based on the failure occurrence date for the recommended maintenance work. The recommended maintenance date indicates a date for which the determined maintenance is recommended to be performed by the maintenance worker. For example, the recommended maintenance date is a date before the earliest failure occurrence date of the failure occurrence dates for the recommended maintenance work.

The output unit 313 outputs the determination result of the determination unit 312. For example, the output unit 313 outputs a maintenance work list (e.g., a maintenance task list) to the terminal 2. The maintenance work list includes identification information identifying a target of the maintenance work, the recommended maintenance date, the recommended maintenance work, and a non-recommended or optional maintenance work. The identification information includes a serial number, a model number, and a user name of the image forming apparatus 1 that is the target of the maintenance work. The non-recommended maintenance work is a maintenance work that is not determined to be the recommended maintenance work among the maintenance works included in the alert item list.

Note that the acquisition unit 310, the diagnosis unit 311, the determination unit 312, and the output unit 313 are described as being installed on the processor 31 by executing a program, but are not limited thereto. The acquisition unit 310 and the output unit 313 relate to data communication between the maintenance support apparatus 3 and other apparatuses. Therefore, the communication interface 34 may be an example of the acquisition unit 310 and the output unit 313. The acquisition unit 310 and the output unit 313 may be realized by the cooperation of the processor 31 and the communication interface 34 by executing a program.

Figure 2:
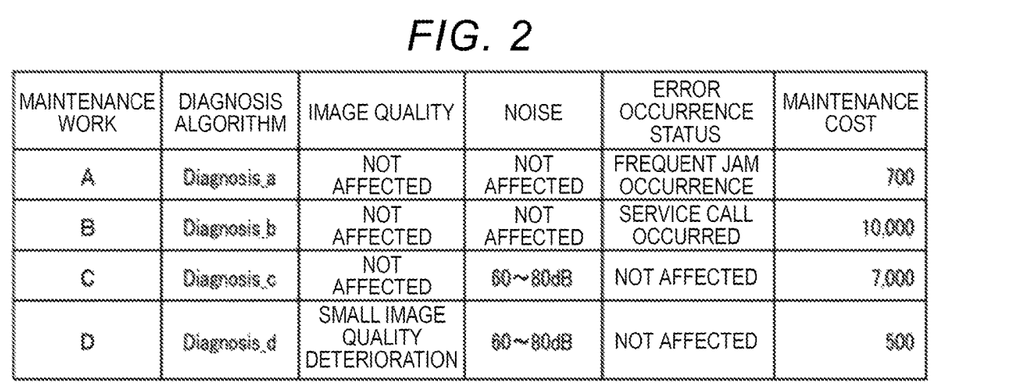
FIG. 2 is a diagram illustrating an acceptable maintenance level database included in a maintenance support apparatus according to an embodiment.

An exemplary configuration of the estimated failure level database 333 will be described. FIG. 2 is a diagram illustrating the estimated failure level database 333, according to an exemplary embodiment. The estimated failure level database 333 includes a "Maintenance Work" item, a "Diagnosis Algorithm" item, an "Image Quality" item, a "Noise" item, an "Error Occurrence Status" item, and a "Maintenance Cost" item. The "Maintenance Work" item is an item for setting a maintenance work for identifying the maintenance work. Each of the plurality of maintenance works is correlated with each item as the estimated failure level record by the estimated failure level database 333. The "Diagnosis Algorithm" item is an item for setting a diagnosis algorithm for diagnosing a failure corresponding to each maintenance work. The "Image Quality" item is an item for setting a degree of influence on the image quality due to the failure diagnosed by each diagnosis algorithm. For example, in the example of FIG. 2, when an alert is issued in the diagnosis algorithm "Diagnosis_a" corresponding to the maintenance work "A", it indicates that the image quality is not affected. The "Noise" item is an item for setting a degree of influence on the operation sound by a failure diagnosed by each diagnosis algorithm. For example, in the example of FIG. 2, when an alert is issued in the diagnosis algorithm "Diagnosis_a" corresponding to the maintenance work "A", it indicates that the operation sound is not affected. The "Error Occurrence Status" item is an item for setting an error occurrence status of a failure diagnosed by each diagnosis algorithm. For example, in the example of FIG. 2, when an alert is issued from the diagnosis algorithm "Diagnosis_a" corresponding to the maintenance work "A", it indicates that jam occurs frequently. The "Image Quality" item, the "Noise" item, and the "Error Occurrence Status" item are collectively referred to as the failure items. In the failure items, the estimated failure level indicates a status and a degree of the failure with texts, but it may be indicated with a numerical value according to the status and the degree of the failure. The "Maintenance Cost" item is an item for setting a cost required for each maintenance work. For example, in the example of FIG. 2, it indicates that maintenance work "A" requires 700 yen. The items of the estimated failure level record are not limited to the items mentioned above, and items may be added or deleted. The estimated failure level record may be updated as the acceptable maintenance level record is updated. The maintenance support apparatus 3 updates the estimated failure level database 333 as appropriate.

Figure 3:
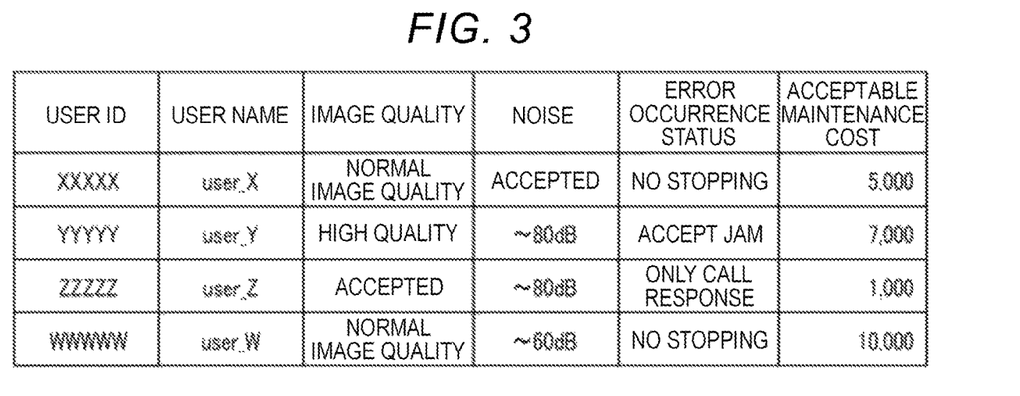
FIG. 3 is a diagram illustrating an estimated failure level database included in the maintenance support apparatus.

An exemplary configuration of the acceptable maintenance level database 334 will be described. FIG. 3 is a diagram illustrating the acceptable maintenance level database 334, according to an exemplary embodiment. The acceptable maintenance level database 334 includes a "User ID" item, a "User Name" item, an "Image Quality" item, a "Noise" item, an "Error Occurrence Status" item, and an "Acceptable Maintenance Cost" item. The "User ID" item is an item for setting a user ID for identifying a user related to each image forming apparatus 1. Each of the plurality of user IDs is correlated with each item as an acceptable maintenance level record by the acceptable maintenance level database 334. The "User Name" item is an item for setting a user name of the user related to the image forming apparatus 1. The "Image Quality" item is an item for setting a degree of image quality acceptable to the user. For example, in the example of FIG. 3, the user with the user ID "XXXXX" accepts "normal image quality". The "normal image quality" indicates that a slight disturbance in image quality is accepted, but maintenance is required when a status inferior to the "normal image quality" is estimated. The "Noise" item is an item for setting a degree of noise acceptable to the user. For example, in the example of FIG. 3, the user with the user ID "XXXXX" "accepts" the noise. When the noise is "accepted", it indicates that the operation sound does not matter, and maintenance is unnecessary even when a status is estimated that noise is generated. The "Error Occurrence Status" item is an item for setting a degree of error occurrence status acceptable to the user. For example, in the example of FIG. 3, the user with the user ID "XXXXX" requires "No Stopping" for the error occurrence status. Specifically, "No Stopping" requires that the image forming apparatus 1 be always in an operable state and indicates that maintenance is necessary if the status is estimated that the image forming apparatus 1 is to be stopped. The "Image Quality" item, the "Noise" item, and the "Error Occurrence Status" item are collectively referred to as the failure items. In the failure item, the acceptable maintenance level indicates the degree of acceptability with the texts, but may also indicate it with a numerical value according to the degree of acceptability. The "Acceptable Maintenance Cost" item is an item for setting a maintenance cost for additional maintenance work which is acceptable to the user. For example, in the example of FIG. 3, a user with user ID "XXXXX" accepts a maintenance cost of up to "5,000" yen. The "5,000" indicates that the additional maintenance work within the range of 5,000 yen is accepted. The items of the acceptable maintenance level record are not limited to the items described above, and items may be added or deleted. For example, the acceptable maintenance level record may be initialized upon installation of the image forming apparatus 1, or may be updated when maintenance work is performed. The acceptable maintenance level record may be updated any time upon request of the user. The maintenance support apparatus 3 updates the acceptable maintenance level database 334 as appropriate.

The sequence of a process by the maintenance support system 100 will be described. Note that the sequence of the process described below is merely an example, and each process may be changed as much as possible. In the sequence of the process described below, steps may be omitted, replaced, and added as appropriate according to embodiments.

In the example, the user who owns or manages the image forming apparatus 1 is user X. The user X is specified by the user ID "XXXXX" shown in FIG. 3.

Figure 4:
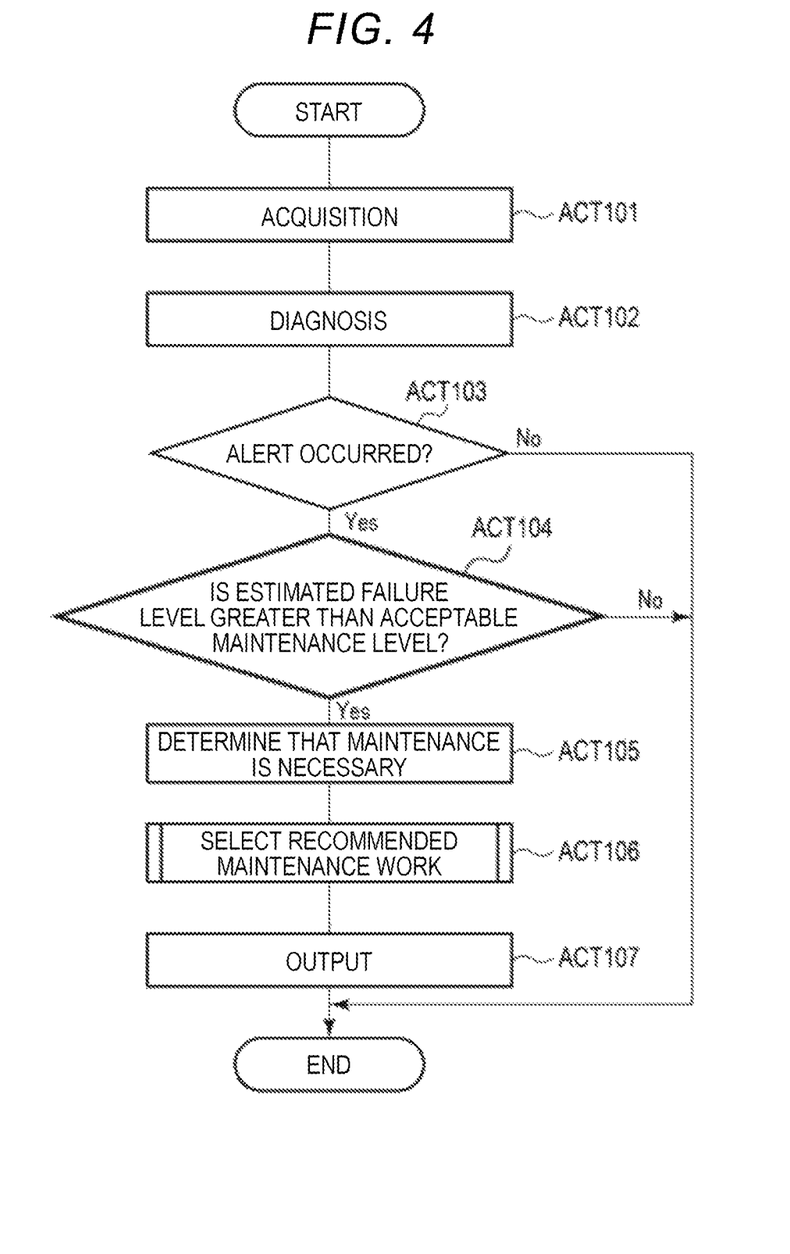
FIG. 4 is a flowchart illustrating a sequence of a process of determining whether maintenance is necessary by the maintenance support system.

FIG. 4 is a flowchart illustrating a sequence of a process of determining whether maintenance is necessary by the maintenance support system 100, according to an exemplary embodiment. The acquisition unit 310 acquires the operation log data of the image forming apparatus 1 (ACT 101). In ACT 101, for example, the acquisition unit 310 acquires the operation log data from the image forming apparatus 1 via the communication interface 34. The acquisition unit 310 saves the acquired operation log data in the auxiliary storage device 33. The acquisition unit 310 updates the operation log data 331 in response to acquiring the operation log data. The updating of the operation log data 331 includes a process such as creation, addition, deletion, and change of the operation log data records.

The diagnosis unit 311 diagnoses the operation log data acquired by the acquisition unit 310 by each of the plurality of diagnosis algorithms (ACT 102). In ACT 102, for example, the diagnosis unit 311 acquires the operation log data for the image forming apparatus 1 from the auxiliary storage device 33. The diagnosis unit 311 diagnoses the operation log data by (e.g., based on, according to, using, etc.) a diagnosis algorithm corresponding to each maintenance work. For example, the diagnosis unit 311 issues an alert for the maintenance work corresponding to the diagnosis algorithm that determines that a future failure is to occur within a certain period of time based on the diagnosis result. In this example, the diagnosis unit 311 compares each piece of data related to the component or the like that is the target of the maintenance work corresponding to the diagnosis algorithm among the pieces of data included in the operation log data, with a given threshold value. For example, the threshold value may be a value at which no failure occurs, but is close to a value at which a failure will occur in the future within a certain period of time. The threshold value may be set appropriately. Diagnosis of the presence of a future failure within a certain period of time using the operation log data by the diagnosis algorithm may be performed by a known technique. Since each diagnosis algorithm corresponds to different maintenance works, the data used by the diagnosis unit 311 among the pieces of data included in the operation log data differs according to the diagnosis algorithm. For example, the diagnosis unit 311 estimates a failure occurrence date for the maintenance work for which an alert is issued. In this example, the diagnosis unit 311 may estimate a failure occurrence date according to a degree of deviation between the data and the threshold value included in the operation log data. For example, the diagnosis unit 311 creates an alert item list indicating maintenance work for which an alert is issued. The alert item list includes a failure occurrence date correlated with each maintenance work. The diagnosis unit 311 saves the alert item list in the auxiliary storage device 33. The diagnosis unit 311 updates the alert item list in response to diagnosing the operation log data. The updating of the alert item list includes a process such as creation, addition, deletion, and change of records.

When the diagnosis unit 311 issues an alert for the maintenance work that is diagnosed to be estimated to be a failure (ACT 103: YES), the process transitions from ACT 103 to ACT 104. When the determination unit 312 does not issue an alert (ACT 103: NO), the process ends.

The determination unit 312 compares the estimated failure level, which corresponds to one or more maintenance works for which an alert is issued based on the diagnosis result of the diagnosis unit 311, with the acceptable maintenance level of the user (ACT 104). In ACT 104, for example, the determination unit 312 identifies the user ID of the user X based on the serial number included in the operation log data and the user-device database 332. The determination unit 312 acquires the acceptable maintenance level record of the user X from the acceptable maintenance level database 334 based on the specified user ID of the user X. The determination unit 312 compares the corresponding estimated failure level record with the acceptable maintenance level record of the user X for each maintenance work for which an alert is issued by the diagnosis unit 311. For example, the determination unit 312 determines whether the estimated failure level exceeds the acceptable maintenance level in the failure item of the estimated failure level record and the acceptable maintenance level record. For example, the determination unit 312 determines that the estimated failure level exceeds the acceptable maintenance level, when the numerical value of the failure item of the estimated failure level is greater than the numerical value of the corresponding failure item of the acceptable maintenance level. According to the example, the maintenance support apparatus 3 may determine a desired maintenance work according to the maintenance level of the user.

A case in which a plurality of failure items are set for each of the maintenance work in the estimated failure level record and the acceptable maintenance level record will be described. In the example, the determination unit 312 compares, for one or more maintenance works for which alert is issued, the acceptable maintenance level and the estimated failure level with respect to a plurality of failure items. The determination unit 312 determines that the estimated failure level exceeds the acceptable maintenance level, when the numerical value of at least one failure item of the estimated failure level is greater than the numerical value of the corresponding failure item of the acceptable maintenance level. The determination unit 312 determines whether maintenance of the image forming apparatus 1 is necessary, depending on whether the estimated failure level exceeds the acceptable maintenance level for at least one failure item. According to the example, the maintenance support apparatus 3 may determine a desired maintenance work according to the maintenance level for each failure item of the user.

When the determination unit 312 determines that the estimated failure level exceeds the acceptable maintenance level (ACT 104: YES), the process transitions from ACT 104 to ACT 105. When the determination unit 312 determines that the estimated failure level does not exceed the acceptable maintenance level (ACT 104: NO), the process ends.

The determination unit 312 determines whether maintenance of the image forming apparatus 1 is necessary, based on comparison between an estimated failure levels, which correspond to one or more maintenance works for which an alert is issued based on a result of diagnosis of the diagnosis unit 311, and the acceptable maintenance levels of the user (ACT 105). In ACT 105, for example, when determining that the estimated failure level corresponding to one or more maintenance works exceeds the acceptable maintenance level, the determination unit 312 determines that maintenance of the image forming apparatus 1 is necessary. On the other hand, for example, when determining that the estimated failure level corresponding to one or more maintenance works does not exceed the acceptable maintenance level, the determination unit 312 determines that maintenance of the image forming apparatus 1 is unnecessary. Specifically, when there is no maintenance work including a failure item with the estimated failure level exceeding the acceptable maintenance level, the determination unit 312 determines that maintenance of the image forming apparatus 1 is unnecessary. For example, in the example of FIG. 2, a case in which an alert is issued by the diagnosis algorithm "Diagnosis_a" corresponding to the maintenance work "A" will be described. The estimated failure level for "Error Occurrence Status" is "Frequent Jam Occurrence". Here, for the user X in FIG. 3, the acceptable maintenance level for the "Error Occurrence Status" is "No Stopping". The user X is the one who does not accept jamming. Therefore, the determination unit 312 determines that maintenance of the image forming apparatus 1 is necessary. On the other hand, for the user Y with user ID "YYYYY" in FIG. 3, the acceptable maintenance level for the "Error Occurrence Status" is "Accept Jam". The user Y is the one who accepts jamming. Therefore, the determination unit 312 determines that maintenance of the image forming apparatus 1 is unnecessary. According to the example, the maintenance support apparatus 3 may determine whether maintenance is necessary according to the maintenance level of the user.

When determining that maintenance of the image forming apparatus 1 is necessary, the determination unit 312 selects recommended maintenance work based on the alert item list (ACT 106). The process of selecting the recommended maintenance work will be described below with reference to FIG. 5.

The output unit 313 outputs the determination result of the determination unit 312 (ACT 107). In ACT 107, for example, the output unit 313 outputs the result of the recommended maintenance work selection process by the determination unit 312 to the terminal 2 as a maintenance work list.

Figure 5:
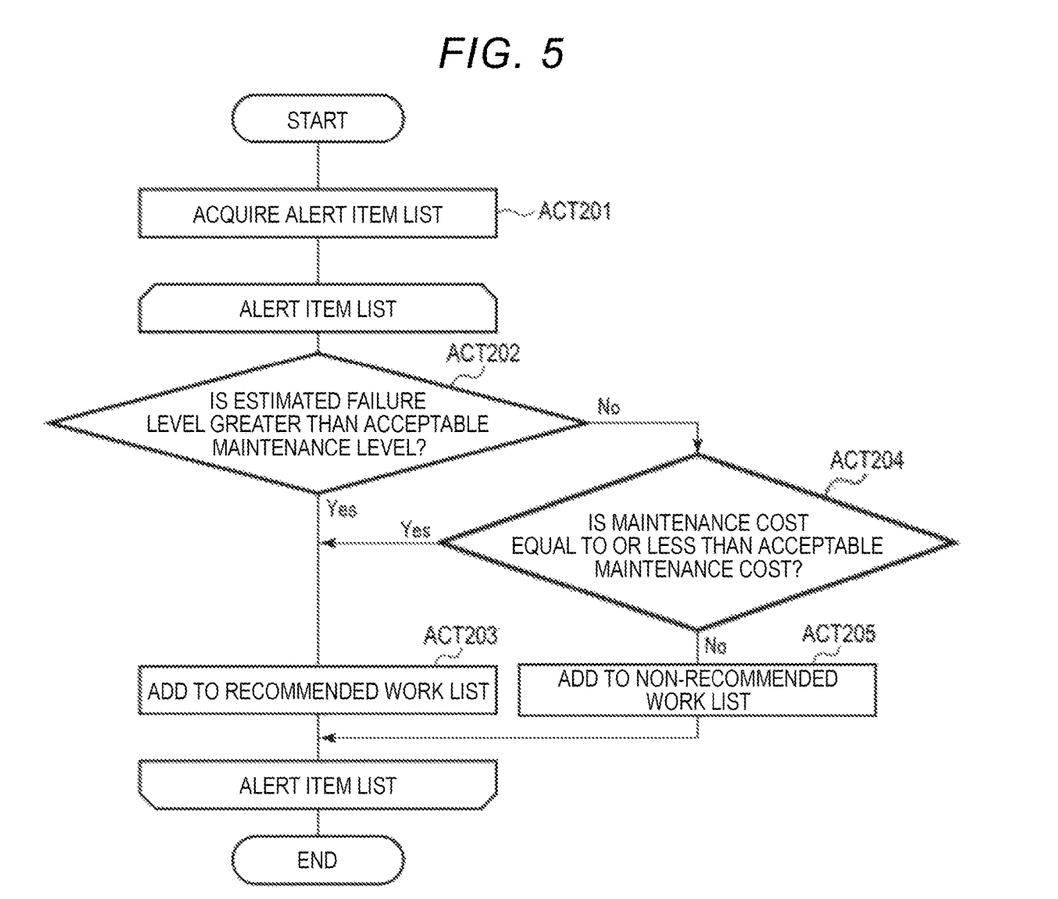
FIG. 5 is a flow chart illustrating a sequence of a process of selecting recommended maintenance work by the maintenance support system.

FIG. 5 is a flowchart illustrating a sequence of a process of selecting recommended maintenance work by the maintenance support system 100. The determination unit 312 acquires the alert item list from the auxiliary storage device 33 (ACT 201). For example, the determination unit 312 repeats the process from ACT 202 to ACT 205 for the maintenance work for which an alert is issued, based on the alert item list.

The determination unit 312 compares the estimated failure level corresponding to one or more maintenance works included in the alert item list, with the acceptable maintenance level of the user X (ACT 202). In ACT 202, for example, the determination unit 312 compares the estimated failure level record corresponding to each of the one or more maintenance works included in the alert item list, with the acceptable maintenance level record of the user X. For example, the determination unit 312 determines whether the estimated failure level exceeds the acceptable maintenance level in the failure item of the estimated failure level record and the acceptable maintenance level record. For example, the determination unit 312 determines that the estimated failure level exceeds the acceptable maintenance level, when the numerical value of the failure item of the estimated failure level is greater than the numerical value of the corresponding failure item of the acceptable maintenance level. A case in which a plurality of failure items are set in the estimated failure level record and the acceptable maintenance level record will be described. In the example, the determination unit 312 determines that the estimated failure level exceeds the acceptable maintenance level when the numerical value of at least one failure item of the estimated failure level is greater than the numerical value of the corresponding failure item of the acceptable maintenance level. Note that the determination unit 312 may refer to the comparison result of ACT 104.

When the determination unit 312 determines that the estimated failure level exceeds the acceptable maintenance level (ACT 202: YES), the process transitions from ACT 202 to ACT 203. When the determination unit 312 determines that the estimated failure level does not exceed the acceptable maintenance level (ACT 202: NO), the process transitions from ACT 202 to ACT 204.

The determination unit 312 determines that the maintenance work, which includes at least one failure item with the estimated failure level exceeding the acceptable maintenance level, is the recommended maintenance work (ACT 203). In the ACT 203, for example, when the determination unit 312 determines that there is a failure item with a corresponding estimated failure level exceeding the acceptable maintenance level of the user X for one or more maintenance works included in the alert item list, the determination unit 312 determines that the maintenance work is the required maintenance work. The determination unit 312 registers the required maintenance work in the maintenance work list as a recommended maintenance work. The maintenance work list is updated in response to determining the recommended maintenance work. According to the example, the maintenance support apparatus 3 may select a desired maintenance work according to the maintenance level of the user.

The determination unit 312 compares the maintenance cost and the acceptable maintenance cost of the user X (ACT 204). In ACT 204, for example, the determination unit 312 compares the maintenance cost with the acceptable maintenance cost of the user X for the maintenance work that does not include the failure item with the estimated failure level exceeding the acceptable maintenance level. When the maintenance cost is equal to or less than the acceptable maintenance cost of the user X (ACT 204: YES), the process transitions from ACT 204 to ACT 203.

The determination unit 312 determines that the maintenance work with the maintenance cost equal to or less than the acceptable maintenance cost of the user X is an additional maintenance work. The determination unit 312 registers the additional maintenance work in the maintenance work list as a recommended maintenance work (ACT 203). In ACT 203, for example, the determination unit 312 adds the additional maintenance work in the maintenance work list as a recommended maintenance work. According to the example, with one occasion of maintenance work, the maintenance support apparatus 3 may select a maintenance work as a maintenance requiring work which is within the acceptable maintenance cost of the user and also suitable for the maintenance level of the user. Therefore, the maintenance support apparatus 3 may prevent an excess service and provide an efficient maintenance service.

In ACT 203, the determination unit 312 determines that the recommended maintenance date is a day before the earliest failure occurrence date among the failure occurrence dates of the recommended maintenance work based on the alert item list. For example, the determination unit 312 registers the recommended maintenance date in the maintenance work list. The maintenance work list is updated in response to determining the additional maintenance work or determining the recommended maintenance date. According to the example, the maintenance support apparatus 3 may recommend an appropriate time for performing the maintenance work.

When the determination unit 312 determines that the maintenance cost exceeds the acceptable maintenance cost of the user X (ACT 204: NO), the process transitions from ACT 204 to ACT 205.

The determination unit 312 registers the maintenance work with the maintenance cost exceeding the acceptable maintenance cost of the user X in the maintenance work list as a non-recommended maintenance work (ACT 205). The maintenance work list is updated in response to determining the non-recommended maintenance work. According to this example, since the maintenance support apparatus 3 does not recommend the maintenance work exceeding the maintenance cost of the user, excess service may be prevented.

An example of the process of ACT 202 to ACT 205 is illustrated below. For example, for the image forming apparatus 1 correlated with the user X, it is assumed that an alert is issued for the maintenance works "A", "B", "C" and "D" shown in the estimated failure level database of FIG. 2. The records related to the maintenance works "A", "B", "C", and "D" are registered in the alert item list. First, regarding the maintenance works "A" and "B", the estimated failure level exceeds the acceptable maintenance level in the "Error Occurrence Status". Accordingly, the determination unit 312 registers the maintenance works "A" and "B" in the maintenance work list as the recommended maintenance works. Next, the determination unit 312 compares the maintenance cost and the acceptable maintenance cost for the maintenance works "C" and "D" that do not include the failure item with the estimated failure level exceeding the acceptable maintenance level. For the maintenance work "C", the maintenance cost "7,000 yen" exceeds the acceptable maintenance cost "5,000 yen" of the user X. Accordingly, the determination unit 312 registers the maintenance work "C" in the maintenance work list as the non-recommended maintenance work. For the maintenance work "D", the maintenance cost "500 yen" is equal to or less than the acceptable maintenance cost "5,000 yen" of the user X. Accordingly, the determination unit 312 registers the maintenance work "D" in the maintenance work list as the recommended maintenance work.

Figure 6:
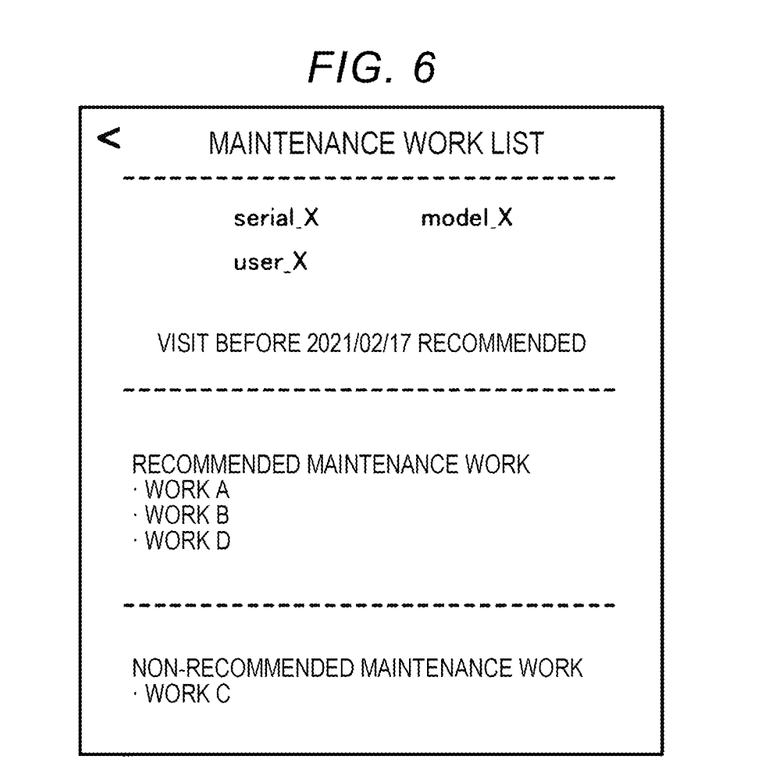
FIG. 6 is a diagram schematically showing an exemplary configuration of a maintenance work list provided by the maintenance support system.

FIG. 6 is a diagram schematically showing an exemplary configuration of the maintenance work list provided by the maintenance support system 100. The maintenance work list includes identification information for identifying the image forming apparatus 1 that performs the maintenance work, a recommended maintenance date, a message for recommending maintenance, a recommended maintenance work, and a non-recommended maintenance work. The identification information includes a user name, a serial number, and a model number. The identification information is displayed based on the user-device database 332 stored in the auxiliary storage device 33. The recommended maintenance date, the recommended maintenance work, and the non-recommended maintenance work are displayed based on the maintenance work list stored in the auxiliary storage device 33. In the example of FIG. 6, the message for recommending maintenance is "VISIT BEFORE 2021/02/17 RECOMMENDED" or "Maintenance Recommended Until Feb. 17, 2021". The maintenance work list is displayed on the terminal 2. The display items and display modes of the maintenance work list are not limited to the example of FIG. 6. According to the example, the maintenance support apparatus 3 may provide necessary maintenance work according to the maintenance level of the user and appropriate time to execute the maintenance work. Accordingly, the maintenance worker may check the recommended maintenance work and the non-recommended maintenance work, and avoid excess maintenance service.

Note that, in the above example, although the maintenance of the image forming apparatus is illustrated, the apparatus as a target of the maintenance is not limited to the image forming apparatus. The example described above may be applied to the maintenance of various apparatuses that require regular maintenance.

The maintenance support apparatus 3 may be realized by one apparatus as described in the example described above, or may be realized by a system in which the functions are distributed among a plurality of apparatuses.

Note that the transfer of the apparatus is generally performed in a state where the program is stored in the main memory or the auxiliary storage device. However, exemplary embodiments are not limited thereto, and the transfer thereof may be performed in a state where the program is not stored in the main memory or the auxiliary storage device. Here, a program transferred separately from the apparatus may be written in a writable storage device provided in the apparatus according to an operation of the user or the like. The program may be transferred by recording it on a removable recording medium or by communication via a network. The recording medium such as a CD-ROM, a memory card, and the like may have any form as long as it can store the program and be read by the apparatus. The function obtained by installing or downloading the program may be one that realizes the function in cooperation with the operating system (OS) or the like inside the apparatus.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A maintenance support apparatus, comprising:
   one or more processors; and
   a memory having instructions stored thereon that, when executed by the one or more processors, cause the one or more processors to:
   store both (a) acceptable maintenance levels associated with a user that are related to an apparatus and (b) estimated failure levels corresponding to a plurality of diagnosis algorithms correlated with a plurality of maintenance tasks;
   acquire operation log data of the apparatus;
   diagnose the operation log data according to each of the plurality of diagnosis algorithms to identify one or more maintenance tasks for which an alert should be issued;
   determine whether maintenance of the apparatus is necessary based on a comparison between (a) the estimated failure levels corresponding to the one or more maintenance tasks identified when diagnosing the operation log data and (b) the acceptable maintenance levels of the user; and
   provide a notification indicating whether maintenance of the apparatus is necessary.

2. The maintenance support apparatus of claim 1, wherein:
   the acceptable maintenance levels relate to a plurality of failure items;
   the estimated failure levels relate to the plurality of failure items; and
   the instructions, when executed by the one or more processors, cause the one or more processors to:
   determine that maintenance of the apparatus is necessary in response to the estimated failure level corresponding to the one or more maintenance tasks identified when diagnosing the operation log data exceeding the acceptable maintenance level for at least one failure item.

3. The maintenance support apparatus of claim 2, wherein the plurality of failure items include at least one of an image quality, a noise level, or an error occurrence status.

4. The maintenance support apparatus of claim 2, wherein the instructions, when executed by the one or more processors, cause the one or more processors to:
   store both (a) an acceptable maintenance cost considered acceptable by the user, and (b) a maintenance cost corresponding to each of the plurality of maintenance tasks;
   identify a first maintenance task as recommended in response to a determination that the first maintenance task is associated with at least one failure item for which the estimated failure level exceeds the acceptable maintenance level;
   identify a second maintenance task as recommended in response to a determination that (a) the second maintenance task has a maintenance cost equal to or less than the acceptable maintenance cost, (b) the second maintenance task is not associated with a failure item for which the estimated failure level exceeds the acceptable maintenance level, and (c) the controller identified the second maintenance task when diagnosing the operation log data; and
   identify the recommended maintenance tasks in the notification.

5. The maintenance support apparatus of claim 4, wherein the instructions, when executed by the one or more processors, cause the one or more processors to:
   determine a failure occurrence date for each of the one or more maintenance tasks identified when diagnosing the operation log data;
   determine that a recommended maintenance date is a day before an earliest failure occurrence date of the failure occurrence dates of the recommended maintenance tasks; and
   identify the recommended maintenance date in the notification.

6. The maintenance support apparatus of claim 1, wherein the apparatus is an image forming apparatus.

7. The maintenance support apparatus of claim 1, wherein the apparatus includes a scanner.

8. The maintenance support apparatus of claim 1, further comprising a display operatively coupled to the controller and configured to display the notification indicating whether maintenance of the apparatus is necessary.

9. The maintenance support apparatus of claim 1, wherein the notification includes a maintenance task list identifying a recommended maintenance task, a non-recommended maintenance task, and a recommended maintenance date.

10. A maintenance support method for use with a maintenance support apparatus, the method comprising:
receiving acceptable maintenance levels associated with a user that are related to an apparatus;
receiving estimated failure levels corresponding to a plurality of diagnosis algorithms correlated with a plurality of maintenance tasks;
receiving operation log data from the apparatus;
diagnosing the operation log data using each of the plurality of diagnosis algorithms;
issuing an alert identifying one or more maintenance tasks based on the diagnosis result;
determining whether maintenance of the apparatus is necessary based on a comparison between (a) the estimated failure levels corresponding to the one or more maintenance tasks for which the alert is issued based and (b) the acceptable maintenance levels of the user; and
providing a notification indicating whether maintenance of the apparatus is necessary.

11. The maintenance support method of claim 10, wherein:
the acceptable maintenance levels relate to a plurality of failure items;
the estimated failure levels relate to the plurality of failure items; and
determining whether maintenance of the apparatus is necessary includes:
comparing (a) the estimated failure levels related to the plurality of failure items with (b) the acceptable maintenance levels related to the plurality of failure items for the one or more maintenance tasks for which the alert is issued; and
determining whether maintenance of the apparatus is necessary based on whether the estimated failure level exceeds the acceptable maintenance level for at least one failure item.

12. The maintenance support method of claim 11, further comprising:
receiving an acceptable maintenance cost considered acceptable by the user;
receiving a maintenance cost corresponding to each of the plurality of maintenance tasks;
identifying a first maintenance task as recommended in response to a determination that the first maintenance task is associated with at least one failure item for which the estimated failure level exceeds the acceptable maintenance level;
identifying a second maintenance task as recommended in response to a determination that (a) the second maintenance task has a maintenance cost equal to or less than the acceptable maintenance cost, (b) the second maintenance task is not associated with a failure item for which the estimated failure level exceeds the acceptable maintenance level, and (c) the one or more maintenance tasks for which the alert is issued includes the second maintenance task; and
identifying the recommended maintenance tasks in the notification.

13. The maintenance support method of claim 12, further comprising:
determining a failure occurrence date for each of the one or more maintenance tasks for which the alert is issued, and
determining that a recommended maintenance date is a day before an earliest failure occurrence date of the failure occurrence dates of the recommended maintenance tasks; and
identifying the recommended maintenance date in the notification.

14. The maintenance support method of claim 10, wherein the apparatus is an image forming apparatus.

15. The maintenance support method of claim 10, further comprising:
determining that maintenance of the apparatus is necessary prior to failure of a component associated with the one or more maintenance tasks for which the alert is issued.

16. The maintenance support method of claim 10, wherein:
the acceptable maintenance levels are first acceptable maintenance levels and the user is a first user; and
the maintenance support method further comprises:
receiving second acceptable maintenance levels associated with a second user.

17. A non-transitory computer-readable medium storing:
acceptable maintenance levels associated with a user that are related to an image forming apparatus;
estimated failure levels corresponding to a plurality of diagnosis algorithms correlated with a plurality of maintenance tasks; and
instructions that, when executed by one or more processors, cause the one or more processors to implement operations comprising:
retrieving operation log data from the image forming apparatus;
diagnosing the operation log data using the diagnosis algorithms to identify one or more maintenance tasks for the image forming apparatus;
recommend one of the identified maintenance tasks based on a comparison between the estimated failure levels corresponding to the identified maintenance tasks and the acceptable maintenance levels of the user; and
providing a maintenance task list including the recommended maintenance task and a recommended maintenance date.

18. The maintenance support apparatus of claim 1, wherein the instructions, when executed by the one or more processors, cause the one or more processors to:
determine that maintenance of the apparatus is necessary prior to failure of a component associated with the one or more maintenance tasks identified when diagnosing the operation log data.

19. The maintenance support apparatus of claim 1, wherein the instructions, when executed by the one or more processors, cause the one or more processors to:
provide the notification prior to failure of a component associated with the one or more maintenance tasks identified when diagnosing the operation log data.

20. The maintenance support apparatus of claim 1, wherein:
the acceptable maintenance levels are first acceptable maintenance levels and the user is a first user; and
the instructions, when executed by the one or more processors, cause the one or more processors to:
store second acceptable maintenance levels associated with a second user.

* * * * *